(12) United States Patent
Noma et al.

(10) Patent No.: US 11,926,131 B2
(45) Date of Patent: Mar. 12, 2024

(54) COMPOSITE MATERIAL AND METHOD FOR CURING COMPOSITE MATERIAL

(71) Applicant: MITSUBISHI HEAVY INDUSTRIES, LTD., Tokyo (JP)

(72) Inventors: Kazuki Noma, Tokyo (JP); Hiromichi Akiyama, Tokyo (JP); Toshio Kozasa, Tokyo (JP); Masayuki Kanemasu, Tokyo (JP); Shunichi Morishima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/979,440

(22) PCT Filed: Feb. 26, 2019

(86) PCT No.: PCT/JP2019/007162
§ 371 (c)(1),
(2) Date: Sep. 9, 2020

(87) PCT Pub. No.: WO2020/003610
PCT Pub. Date: Jan. 2, 2020

(65) Prior Publication Data
US 2021/0001588 A1     Jan. 7, 2021

(30) Foreign Application Priority Data
Jun. 28, 2018   (JP) .................................. 2018-123067

(51) Int. Cl.
*B32B 3/12*     (2006.01)
*B32B 5/02*     (2006.01)
(Continued)

(52) U.S. Cl.
CPC .................. *B32B 3/12* (2013.01); *B32B 5/02* (2013.01); *B32B 7/12* (2013.01); *B32B 27/12* (2013.01); *B32B 2605/18* (2013.01); *B64D 45/02* (2013.01)

(58) Field of Classification Search
None
See application file for complete search history.

(56) References Cited

U.S. PATENT DOCUMENTS 5,123,985 A  *  6/1992  Evans ...................... B29D 7/01
                                                   156/212
5,370,921 A  *  12/1994  Cedarleaf ............... B32B 15/14
                                                   428/138
(Continued)

FOREIGN PATENT DOCUMENTS

JP   H06-190956 A    7/1994
JP   H06-508801 A    10/1994
(Continued)

OTHER PUBLICATIONS

Heatcon Composite Systems, 2008 (Year: 2008).*
(Continued)

*Primary Examiner* — Mary I Omori
(74) *Attorney, Agent, or Firm* — Manabu Kanesaka; Benjamin Hauptman; Kenneth Berner (57) ABSTRACT

A composite material is capable of suppressing decrease in the strength, which is caused by bending of fibers of a skin material during the time when the composite material is cured. A composite material is provided with a honeycomb core, a first skin material, a second skin material, a thunder-resistant mesh and a resin material; and the resin material is not arranged in a neighborhood portion which is the region corresponding to the region at the front end of the honeycomb core. A first film adhesive is arranged between the first skin material and the honeycomb core; a second film adhe-
(Continued)

sive is arranged between the second skin material and the honeycomb core; and a fourth film adhesive is arranged in the neighborhood portion of the resin material in a weight per square meter, which is lower than those of the first film adhesive and the second film adhesive.

6 Claims, 7 Drawing Sheets

(51) Int. Cl.
*B32B 7/12* (2006.01)
*B32B 27/12* (2006.01)
*B64D 45/02* (2006.01)

(56) References Cited

U.S. PATENT DOCUMENTS

| | | | |
|---|---|---|---|
| 5,417,385 A | 5/1995 | Arnold et al. | |
| 7,014,143 B2 | 3/2006 | Pham et al. | |
| 9,751,266 B2 | 9/2017 | Arikawa et al. | |
| 2004/0069895 A1* | 4/2004 | Pham | B64D 45/02 244/1 A |
| 2009/0202826 A1* | 8/2009 | Sekido | B29C 70/48 264/510 |
| 2011/0048637 A1* | 3/2011 | Kohli | C09J 163/00 156/307.1 |
| 2014/0290832 A1* | 10/2014 | Arikawa | B29C 73/12 156/94 |
| 2016/0146349 A1* | 5/2016 | Le Lay | B64F 5/10 428/41.7 |
| 2016/0236768 A1 | 8/2016 | Okamoto et al. | |
| 2016/0362565 A1 | 12/2016 | Kim et al. | |
| 2018/0257790 A1* | 9/2018 | Rahamat | C23C 28/04 |

FOREIGN PATENT DOCUMENTS

| | | |
|---|---|---|
| JP | 2006-502046 A | 1/2006 |
| JP | 2007-015385 A | 1/2007 |
| JP | 2012-529978 A | 11/2012 |
| JP | 2014-188997 A | 10/2014 |
| JP | 2016-147613 A | 8/2016 |

OTHER PUBLICATIONS

Loctite Aerospace, SynSkin® Handling Procedures, May 15, 2012 (Year: 2012).*
Region Definition & Meaning. 2023, Merriam-Webster, www.merriam-webster.com/dictionary/region (Year: 2023).*
PCT/ISA/210, "International Search Report for International Application No. PCT/JP2019/007162," dated Apr. 9, 2019.
PCT/ISA/237, "Written Opinion of the International Searching Authority for International Application No. PCT/JP2019/007162," dated Apr. 9, 2019.

* cited by examiner

COMPOSITE MATERIAL AND METHOD FOR CURING COMPOSITE MATERIAL

RELATED APPLICATIONS

The present application is National Phase of International Application No. PCT/JP2019/007162 filed Feb. 26, 2019, and claims priority from Japanese Application No. 2018-123067, filed Jun. 28, 2018, the disclosure of which is hereby incorporated by reference herein in its entirety.

TECHNICAL FIELD

The present invention relates to a composite material and a method for curing a composite material.

BACKGROUND ART

In recent years, a composite honeycomb sandwich panel exhibiting good strength against bending stress, shear stress, and the like is used as a structural material of an aircraft and the like. The composite honeycomb sandwich panel has a sandwich structure where high-strength skin materials are disposed on upper and lower surfaces of a lightweight core material (honeycomb core). A film adhesive may be used to bond the skin material and the honeycomb core. As an example of such a composite honeycomb sandwich panel, for example, a composite honeycomb sandwich panel described in PTL 1 has been reported.

In order to prevent damage by lightning stroke, in the composite honeycomb sandwich panel used in the aircraft structure, generally, a lightning protection mesh is attached to an aerodynamic surface. In the related art, when the lightning protection mesh is attached to the composite honeycomb sandwich panel, in the composite honeycomb sandwich panel (hereinafter, simply referred to as a "composite material") before curing, the lightning protection mesh and a resin material (for example, a film adhesive (adhesive that integrates the lightning protection mesh with the composite material) or a surface conditioner) are applied to the aerodynamic surface.

CITATION LIST

Patent Literature

[PTL 1] Japanese Unexamined Patent Application Publication No. 2007-15385

SUMMARY OF INVENTION

Technical Problem

Figure 9:
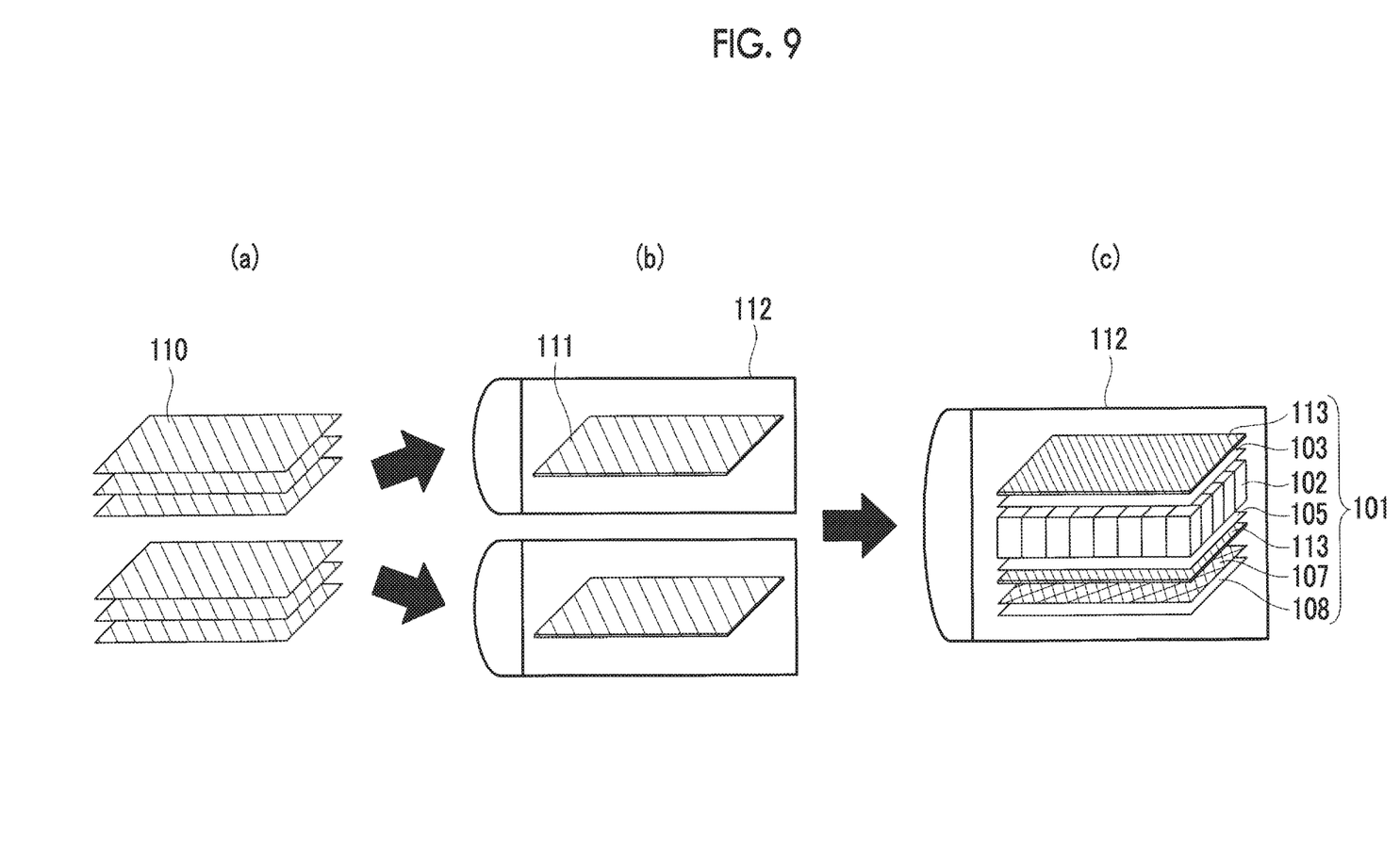
FIGS. 9(a), 9(b) and 9(c) are schematic views for describing one example of a method for producing a composite honeycomb sandwich panel in the related art, in which step of FIG. 9(a) illustrates a state where prepregs for forming skin materials are prepared, step of FIG. 9(b) illustrates a state where the laminated prepregs are cured, and step of FIG. 9(c) is a view illustrating a state where a composite material is cured.

Hereinafter, a method for producing the above composite honeycomb sandwich panel will be described with reference to FIGS. 9(a), 9(b), 9(c), 10(a) and 10(b). FIGS. 9(a), 9(b) and 9(c) are schematic views for describing one example (secondary adhesive molding) of a method for producing a composite honeycomb sandwich panel in the related art. Step of FIG. 9(a) is a view illustrating a state where prepregs for forming skin materials are prepared, step of FIG. 9(b) is a view illustrating a state where the laminated prepregs are cured, and step of FIG. 9(c) is a view illustrating a state where a composite material is cured.

In the production method by the secondary adhesive molding, first, as illustrated in the step of FIG. 9(a), for example, two sets of three prepregs 110 which are two types of upper and lower skin materials are prepared and laminated. Next, as illustrated in the step of FIG. 9(b), the laminated uncured prepregs 111 are each sealed in separate autoclave bags 112 and are cured in an autoclave. As a result, the prepregs are cured, so that two cured prepregs 113 are obtained. In this case, although not illustrated in the drawing, one of the two cured prepregs 113 is cured and integrated with a resin material 108 and a lightning protection mesh 107 to be described later.

Thereafter, the resin material 108, the lightning protection mesh 107, the cured prepreg 113, a second film adhesive 105, a honeycomb core 102, a first film adhesive 103, and the cured prepreg 113 are laminated in order from below to form a composite material 101 (step of FIG. 9(c)). Incidentally, although separately depicted in the step of FIG. 9(c), the resin material 108, the lightning protection mesh 107, and the cured prepreg 113 on the lower side of the drawing sheet in the step of FIG. 9(c) are integrated. The composite material 101 that is obtained is sealed in the autoclave bag 112 and is cured in the autoclave; and thereby, the composite honeycomb sandwich panel can be obtained.

Figure 10:
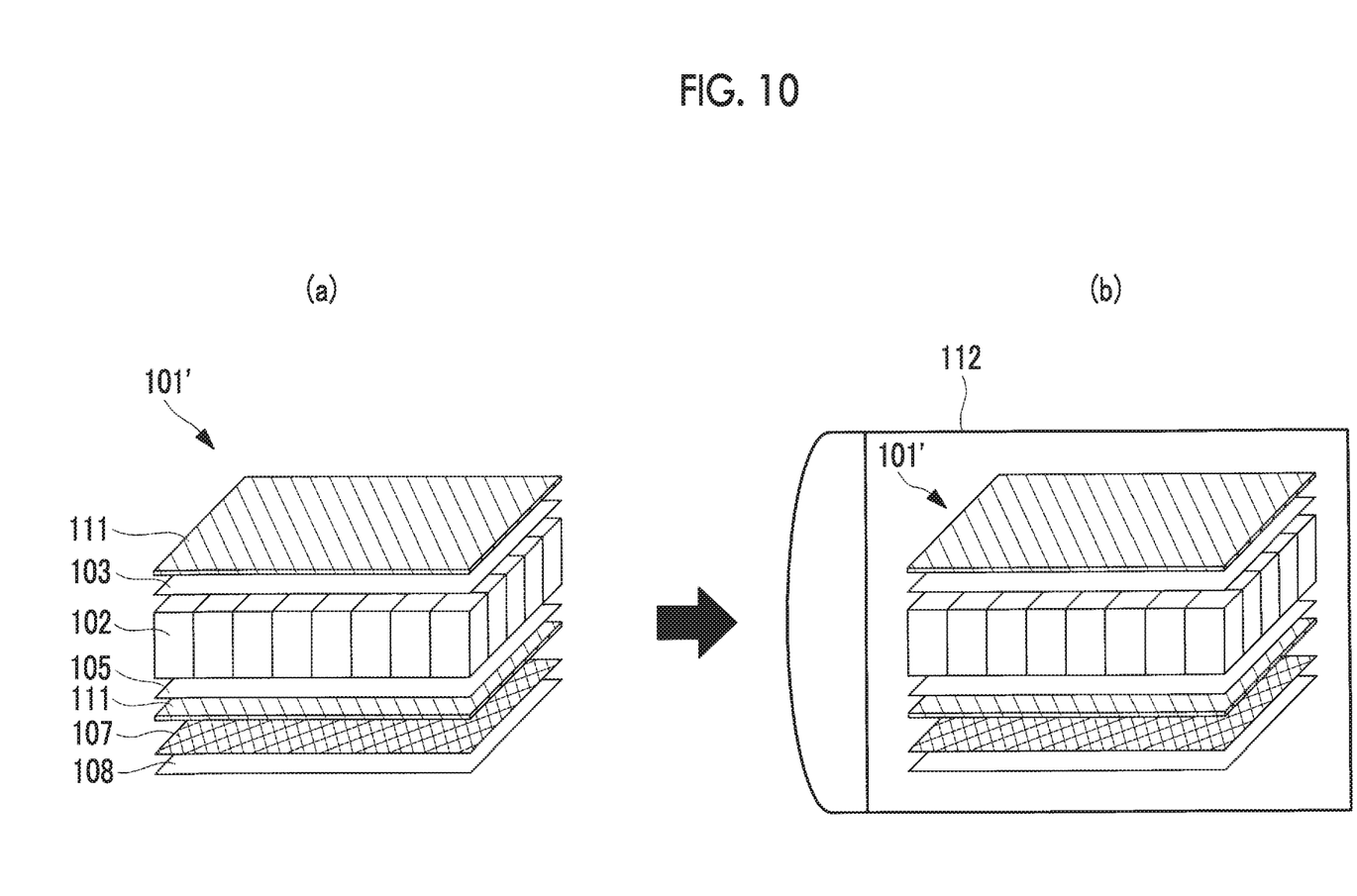
FIGS. 10(a) and 10(b) are schematic views for describing another example of a method for producing a composite honeycomb sandwich panel in the related art, in which step of FIG. 10(a) illustrates a state where a composite material is prepared and step of FIG. 10(b) illustrates a state where the composite material in the step of FIG. 10(a) is cured.

In producing the composite honeycomb sandwich panel, currently, the production method by the secondary adhesive molding as illustrated in FIGS. 9(a), 9(b) and 9(c) are generally used. However, this production method has a drawback that it is required to operate the autoclave twice or more and thus leading to an increase in cost for curing. Therefore, as reported in PTL 1 or the like, in order to reduce the number of operations of the autoclave, as illustrated in FIGS. 10 (a) and 10(b), one-shot molding by which the autoclave is operated once to produce the composite honeycomb sandwich panel has been attempted. Hereinafter, a method for producing a composite honeycomb sandwich panel by one-shot molding as illustrated in FIGS. 10(a) and 10(b) will be described. Step of FIG. 10(a) is a view illustrating a state where a composite material is prepared, and step of FIG. 10(b) is a view illustrating a state where the composite material in the step of FIG. 10(a) is cured.

In the one-shot molding, as illustrated in the step of FIG. 10(a), a composite material 101' obtained by replacing the cured prepreg 113 of the composite material 101 in the step of FIG. 9(c) with an uncured prepreg 111 is prepared. Next, as illustrated in the step of FIG. 10(b), the composite material 101' is sealed in the autoclave bag 112 and is cured in the autoclave. As a result, the composite honeycomb sandwich panel can be produced by operating the autoclave once. Therefore, according to the one-shot molding, in addition to reducing the operation cost of the autoclave, a curing operation with the bag is performed once; and thereby, the molding cost can be reduced. In addition, there is no need to perform a rough trim operation and a jig cleaning operation after the skin is cured, which are required in the secondary adhesive molding.

Here, usually, in molding the composite honeycomb sandwich panel, in order to reduce core crash occurring due to pressure being applied to a side surface of the honeycomb core, chamfering is performed to obliquely cut off an end portion of the honeycomb core at an angle of approximately 30°. A case where a composite material including the honeycomb core subjected to such chamfering is molded by one-shot molding will be described below with reference to FIG. 11.

Figure 11:
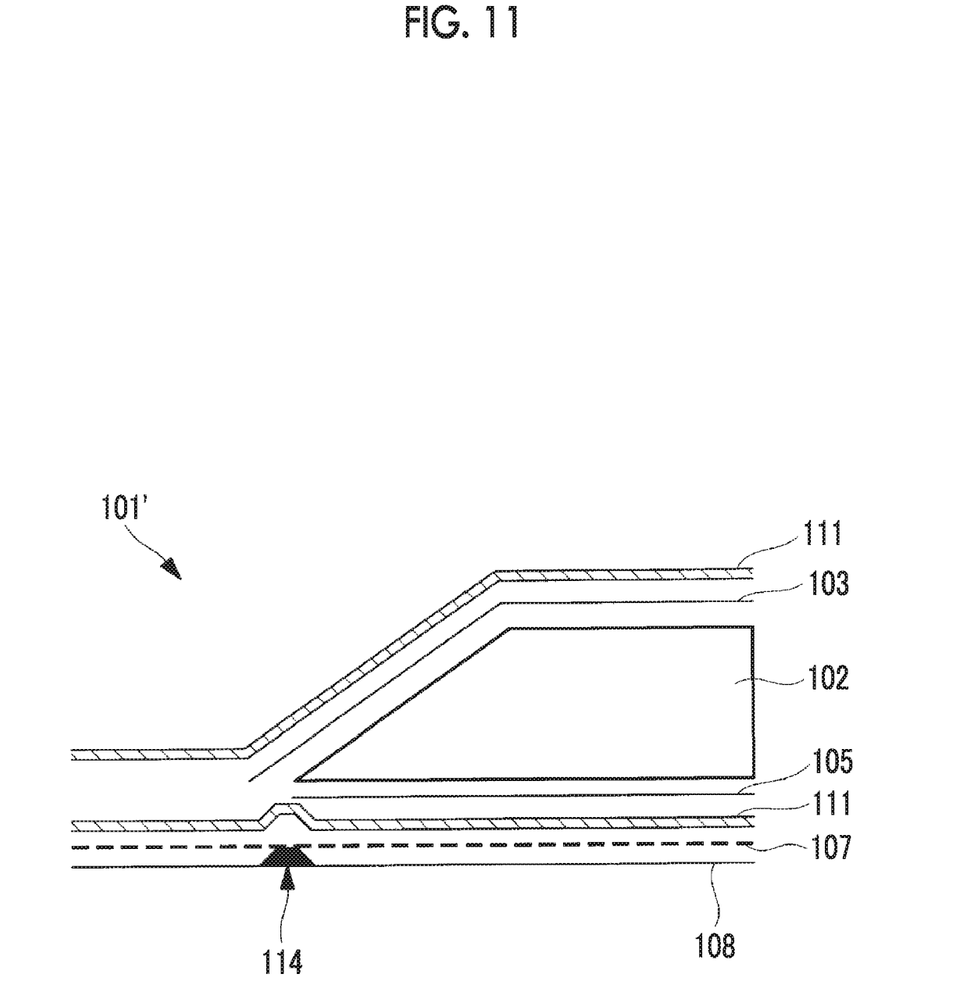
FIG. 11 is a longitudinal cross-sectional view illustrating the state of the vicinity of a tip of an end portion of a honeycomb core when the composite material in the step of FIG. 10(b) is cured.

FIG. 11 is a longitudinal cross-sectional view illustrating the state of the vicinity of a tip of the end portion of the honeycomb core when the composite material 101' in the step of FIG. 10(b) is cured. As illustrated in FIG. 11, when the end portion of the honeycomb core 102 is chamfered, the end portion has an inclined shape, and thus as the uncured prepreg 111 approaches the tip of the end portion of the honeycomb core 102, the uncured prepreg 111 is less likely to conform to the shape of the end portion of the honeycomb core 102. In addition, since the end portion of the honeycomb core 102 has an inclined shape, a portion to which the pressure of the autoclave is relatively less likely to be applied occurs at the tip of the end portion. When one-shot molding is performed to form the composite material 101' described above, the resin material 108 disposed in an outermost layer may be accumulated (adhesive accumulation 114 occurs) in a location where the pressure of the autoclave is relatively less likely to be applied to the tip of the honeycomb core 102. When the adhesive accumulation 114 occurs, fibers of the skin material (the uncured prepreg 111 on the lower side of the drawing sheet of FIG. 11) are bent (wrinkled) due to the adhesive accumulation 114, and thus the strength of the obtained composite honeycomb sandwich panel is reduced, which is a problem.

The invention has been made in light of such circumstances, and an object of the invention is to provide a composite material by which fibers of a skin material can be suppressed from being bent to cause a reduction in strength during curing of the composite material.

Solution to Problem

In order to solve the above problem, the invention employs the following means.

According to the invention, there is provided a composite material including: a honeycomb core; a first skin material disposed on one surface of the honeycomb core to be bonded to the honeycomb core; a second skin material disposed on an opposite surface of the honeycomb core from the one surface to be bonded to the honeycomb core; a lightning protection mesh disposed on an opposite surface of the second skin material from a surface of the second skin material, the surface being bonded to the honeycomb core; and a resin material disposed on an opposite surface of the lightning protection mesh from a second skin material side. The resin material is not disposed in a neighboring portion of the resin material in a region corresponding to a region of a tip of an end portion of the honeycomb core.

In the composite material according to a first aspect of the invention, the resin material is not disposed in the neighboring portion of the resin material in a region corresponding to the region of the tip of the end portion of the honeycomb core. In the composite material used in the aircraft structure, the lightning protection mesh and the resin material are generally applied to an aerodynamic surface. In the composite material, particularly when the end portion of the honeycomb core is chamfered, a portion to which the pressure of an autoclave is relatively less likely to be applied occurs at the tip of the end portion. In this state, when the composite material is cured, the resin material (for example, a film adhesive or a surface conditioner) disposed in an outermost layer may be accumulated (adhesive accumulation occurs) in the portion. When the adhesive accumulation occurs, fibers of the skin material are bent (wrinkled) to cause a reduction in strength, which is a concern. Here, as in the invention, when the resin material is not disposed in the neighboring portion of the resin material (disposed below the honeycomb core) in a region corresponding to the region of the tip of the end portion of the honeycomb core, no adhesive is originally present in a portion where adhesive accumulation is likely to occur. Therefore, even if the adhesive flows to the above portion from the surrounding during curing, adhesive accumulation does not occur. Therefore, the adhesive accumulation can be suppressed from occurring when the composite material is cured. Therefore, during curing of the composite material, the fibers of the skin material can be suppressed from being bent to cause a reduction in strength. The composite material of the invention described above can be suitably used in the aircraft structure. Incidentally, regarding the size of the neighboring portion, for example, in a horizontal view, the length in a rightward and leftward direction may be in a range of 5 mm to 30 mm and preferably in a range of 5 mm to 20 mm. In a horizontal view, the length in a depth direction may be in a range of the length of the honeycomb core in the depth direction+5 mm to the length of the honeycomb core in the depth direction+30 mm and preferably in a range of the length of the honeycomb core in the depth direction+5 mm to the length of the honeycomb core in the depth direction+20 mm.

In the composite material, it is preferable that the first film adhesive bonding the first skin material to the honeycomb core is disposed between the first skin material and the honeycomb core, the second film adhesive bonding the second skin material to the honeycomb core is disposed between the second skin material and the honeycomb core, and a fourth film adhesive having a lower basis weight than the first film adhesive and the second film adhesive is disposed in the neighboring portion of the resin material.

As described above, when the fourth film adhesive having a lower basis weight (smaller amount of resin) than the first film adhesive and the second film adhesive is disposed in the neighboring portion of the resin material, the amount of resin becomes insufficient after the composite material is cured, and thus bubbles can be suppressed from remaining in the surface (lower surface) of the composite material.

According to the invention, there is provided a composite material including: a honeycomb core; a first skin material disposed on one surface of the honeycomb core to be bonded to the honeycomb core; a second skin material disposed on an opposite surface of the honeycomb core from the one surface to be bonded to the honeycomb core; a lightning protection mesh disposed on an opposite surface of the second skin material from a surface of the second skin material, the surface being bonded to the honeycomb core; and a resin material disposed on an opposite surface of the lightning protection mesh from a second skin material side. The resin material has a low basis weight.

In the composite material according to a second aspect of the invention, the resin material has a lower basis weight (smaller amount of resin) (for example, than the first film adhesive and the second film adhesive). As described above, since the resin material having a small amount of resin is used, the amount of resin in the resin material in its entirety can be reduced. As a result, the amount of resin flowing to a portion where adhesive accumulation is likely to occur during curing can be reduced, and thus the adhesive accumulation can be suppressed from occurring when the composite material is cured. Therefore, during curing of the composite material, the fibers of the skin material can be suppressed from being bent to cause a reduction in strength. The composite material of the invention described above can be suitably used in the aircraft structure.

In the composite material, it is preferable that the first film adhesive bonding the first skin material to the honeycomb core is disposed between the first skin material and the honeycomb core, the second film adhesive bonding the second skin material to the honeycomb core is disposed between the second skin material and the honeycomb core, and the resin material has a lower basis weight than the first film adhesive and the second film adhesive.

In such a case, during curing of the composite material, the fibers of the skin material can be certainly suppressed from being bent to cause a reduction in strength.

In the composite material, it is preferable that the basis weight of the resin material is 0.02 psf to 0.04 psf.

As the resin material having a low basis weight, a resin material having such a basis weight can be provided as a specific example.

According to the invention, there is provided a composite material including: a honeycomb core; a first skin material disposed on one surface of the honeycomb core to be bonded to the honeycomb core; a second skin material disposed on an opposite surface of the honeycomb core from the one surface to be bonded to the honeycomb core; a lightning protection mesh disposed on an opposite surface of the second skin material from a surface of the second skin material, the surface being bonded to the honeycomb core; and a resin material disposed on an opposite surface of the lightning protection mesh from a second skin material side. The resin material has a high viscosity.

In the composite material according to a third aspect of the invention, the resin material has a higher viscosity (for example, than the first film adhesive and the second film adhesive). Here, as in the invention, when the resin material (disposed below the honeycomb core) has a high viscosity (for example, 1,000 Pa·S), the fluidity of the adhesive can be reduced when the composite material is cured. As a result, the adhesive can be suppressed from flowing to be accumulated in the vicinity of the tip of the end portion of the honeycomb core. Therefore, the adhesive accumulation can be suppressed from occurring when the composite material is cured. Therefore, during curing of the composite material, the fibers of the skin material can be suppressed from being bent to cause a reduction in strength. The composite material of the invention described above can be suitably used in the aircraft structure.

In the composite material, it is preferable that the first film adhesive bonding the first skin material to the honeycomb core is disposed between the first skin material and the honeycomb core, the second film adhesive bonding the second skin material to the honeycomb core is disposed between the second skin material and the honeycomb core, and the resin material has a higher viscosity than the first film adhesive and the second film adhesive.

In such a case, during curing of the composite material, the fibers of the skin material can be certainly suppressed from being bent to cause a reduction in strength.

In the composite material, it is preferable that a film having irregularities on a surface thereof is disposed on an opposite surface of the resin material from the lightning protection mesh.

As described above, when the film having irregularities on the surface is disposed on the opposite surface of the resin material from the lightning protection mesh, a ventilation circuit is secured by the irregularities of the film during curing of the composite material, and thus bubbles can be suppressed from remaining in the surface (lower surface) of the composite material. As a result, the surface quality can be improved.

In the composite material, it is preferable that the end portion of the honeycomb core is chamfered so as to be inclined toward the second skin material side.

As described above, in the invention, the end portion of the honeycomb core can be chamfered.

According to the invention, there is provided a method for curing a composite material, the method including collectively curing the above-described composite material.

Even if the composite material of the invention is collectively cured and molded (one-shot molding), during curing of the composite material, the fibers of the skin material can be sufficiently suppressed from being bent to cause a reduction in strength. Therefore, one-shot molding is performed, and thus in addition to reducing the operation cost of the autoclave, a curing operation with a bag for curing is performed once; and thereby, the molding cost can be reduced. There is no need to perform a rough trim operation and a jig cleaning operation after the skin material is cured, which are required in secondary adhesive molding, and thus the process is simple.

Advantageous Effects of Invention

According to the composite material of the invention, during curing of the composite material, the fibers of the skin material can be suppressed from being bent to cause a reduction in strength.

DESCRIPTION OF EMBODIMENTS

Hereinafter, embodiments of a composite material according to the invention will be described with reference to the drawings.

First Embodiment

Figure 1:
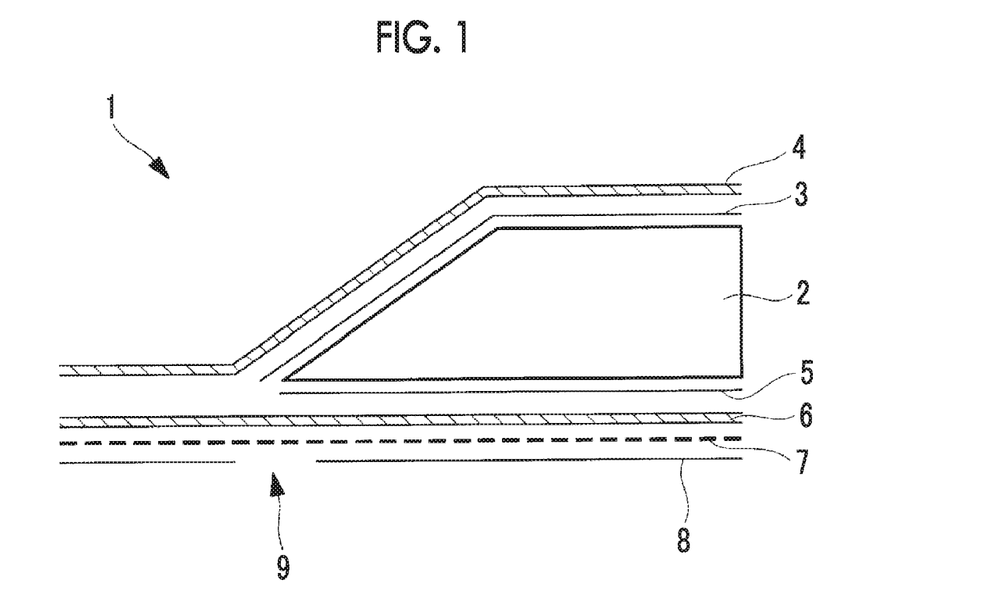
FIG. 1 is a longitudinal cross-sectional view illustrating the state of the vicinity of a tip of an end portion of a honeycomb core when a composite material according to a first embodiment of the invention is cured.

Hereinafter, a composite material according to a first embodiment of the invention will be described with reference to FIGS. 1 and 8.

Figure 8:
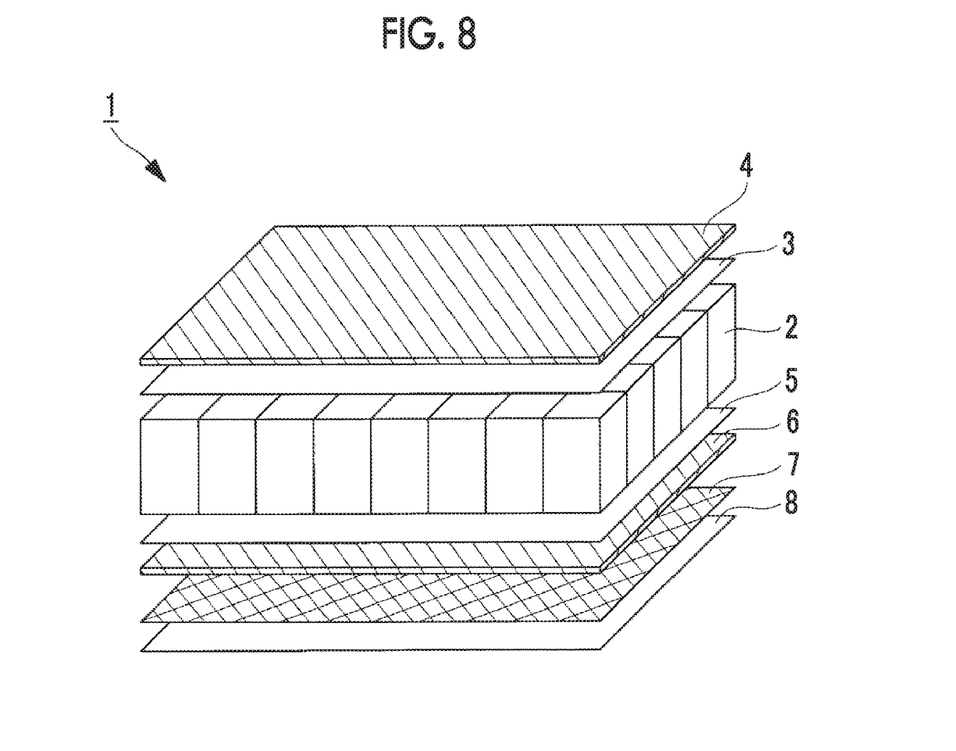
FIG. 8 is a perspective view for describing a configuration of the composite material according to the first embodiment of the invention.

FIG. 8 is a perspective view for describing a configuration of the composite material according to the present embodiment.

As illustrated in FIG. 8, a composite material 1 according to the present embodiment includes a honeycomb core 2, a first film adhesive 3, a first skin material 4, a second film adhesive 5, a second skin material 6, a lightning protection mesh 7, and a third film adhesive (resin material) 8. Specifically, the first film adhesive is disposed on one surface (upper surface) of the honeycomb core 2, and the first skin material 4 is bonded to the honeycomb core 2 via the first film adhesive 3. Meanwhile, the second film adhesive 5 is disposed on an opposite surface (lower surface) of the honeycomb core 2 from the one surface, and the second skin material 6 is bonded to the honeycomb core 2 via the second film adhesive 5. Then, the lightning protection mesh 7 is disposed on an opposite surface of the second skin material 6 from a surface of the second skin material 6, the surface being bonded to the honeycomb core 2, and the third film adhesive 8 is disposed on an opposite surface of the lightning protection mesh 7 from a second skin material 6 side.

An end portion of the honeycomb core 2 is, as will be described later, chamfered so as to be inclined toward the second skin material 6 side. The first skin material 4 and the second skin material 6 are, for example, a plurality of laminated uncured prepregs. As will be described later, the third film adhesive is not disposed in a part of the third film adhesive 8.

Next, the configuration of the vicinity of a tip of the end portion of the honeycomb core 2 in the composite material 1 according to the present embodiment will be specifically described with reference to FIG. 1. FIG. 1 is a longitudinal cross-sectional view illustrating the state of the vicinity of the tip of the end portion of the honeycomb core 2 when the composite material 1 according to the present embodiment is cured. As illustrated in FIG. 1, the end portion of the honeycomb core 2 is chamfered so as to be inclined, for example, at 30° toward the second skin material 6 side. The third film adhesive 8 is not disposed in a neighboring portion 9 of the third film adhesive 8 in a region corresponding to a region of the tip of the (chamfered) end portion of the honeycomb core 2.

As long as the neighboring portion 9 includes the region corresponding to the region of the tip of the end portion of the honeycomb core 2, the shape of the neighboring portion 9 is not particularly limited and may be any shape such as a rectangular shape or a trapezoidal shape.

Incidentally, regarding the size of the neighboring portion 9, for example, in a horizontal view, the length in a rightward and leftward direction (in a rightward and leftward direction in FIG. 1) may be in a range of 5 mm to 30 mm and preferably in a range of 5 mm to 20 mm. In a horizontal view, the length in a depth direction (in a depth direction of the drawing sheet of FIG. 1) may be in a range of the length of the honeycomb core 2 in the depth direction+5 mm to the length of the honeycomb core 2 in the depth direction+30 mm and preferably in a range of the length of the honeycomb core 2 in the depth direction+5 mm to the length of the honeycomb core 2 in the depth direction+20 mm.

According to the present embodiment with the above-described configuration, the following effects are obtained.

In the composite material 1 according to the present embodiment, the third film adhesive 8 is not disposed in the neighboring portion 9 of the third film adhesive 8 in a region corresponding to the region of the tip of the (chamfered) end portion of the honeycomb core 2. As in the present embodiment, when the third film adhesive 8 is not disposed in the neighboring portion 9 of the third film adhesive 8 (disposed below the honeycomb core 2) in a region corresponding to the region of the tip of the end portion of the honeycomb core 2, no adhesive is originally present in a portion where adhesive accumulation is likely to occur. Therefore, even if the adhesive flows to the above portion from the surrounding during curing, adhesive accumulation does not occur. Therefore, the adhesive accumulation can be suppressed from occurring when the composite material 1 is cured. Namely, during curing of the composite material 1, fibers of the skin material (second skin material 6) can be suppressed from being bent to cause a reduction in strength. The composite material 1 of the present embodiment described above can be suitably used in the aircraft structure.

Second Embodiment

Next, a second embodiment of the invention will be described with reference to FIG. 2.

The basic configuration of the present embodiment is basically the same as that of the first embodiment; however, the present embodiment differs from the first embodiment in that a film 22 having irregularities on the surface is disposed on an opposite surface (lower surface) of the third film adhesive 8 from the lightning protection mesh 7. Therefore, in the present embodiment, the different part will be described and the description of other duplicate parts will be omitted.

Incidentally, the same reference signs are assigned to the same components as those of the first embodiment and duplicate descriptions will be omitted.

Figure 2:
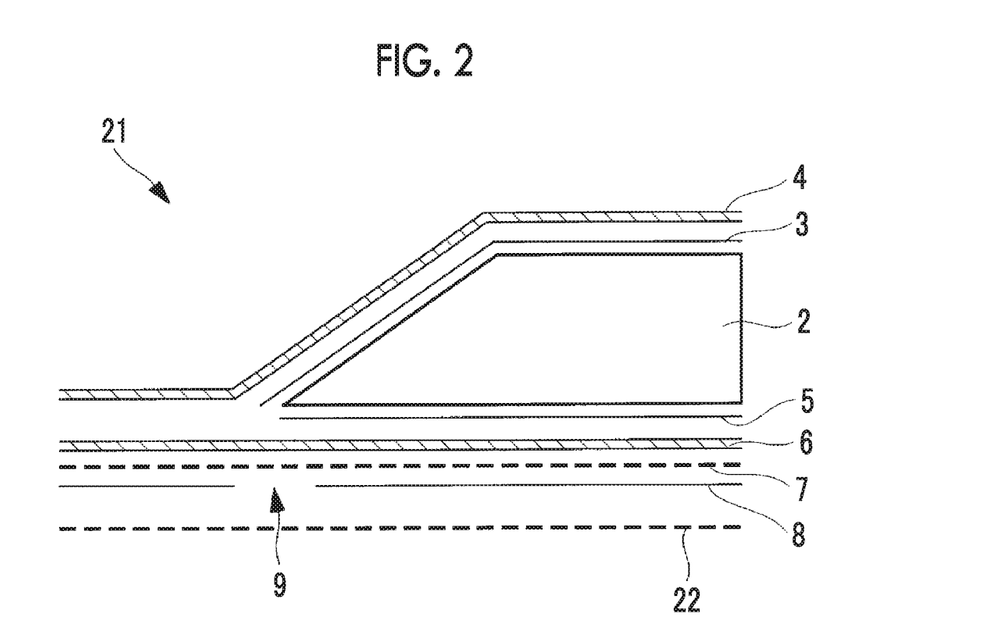
FIG. 2 is a longitudinal cross-sectional view illustrating the state of the vicinity of a tip of an end portion of a honeycomb core when a composite material according to a second embodiment of the invention is cured.

FIG. 2 is a longitudinal cross-sectional view illustrating the state of the vicinity of the tip of the end portion of the honeycomb core 2 when a composite material 21 according to the present embodiment is cured. In the composite material 21 according to the present embodiment, the film 22 having irregularities on the surface is disposed on the opposite surface (lower surface) of the third film adhesive 8 from the lightning protection mesh 7.

The film 22 having irregularities on the surface is a release film and as a specific example, a release fabric such as Tool Tech (registered trademark) obtained by coating glass fibers with PTFE can be provided. The film 22 having irregularities on the surface is peeled off from the composite material 21 after the composite material 21 is cured.

According to the present embodiment with the above-described configuration, the following effects are obtained.

In the composite material 21 according to the present embodiment, the film 22 having irregularities on the surface is disposed on the opposite surface of the third film adhesive 8 from the lightning protection mesh 7. As a result, a ventilation circuit is secured during curing of the composite material 21 by the irregularities of the film, and thus bubbles can be suppressed from remaining in the surface (lower surface) of the composite material 21. As a result, the surface quality can be improved.

Third Embodiment

Next, a third embodiment of the invention will be described with reference to FIG. 3.

The basic configuration of the present embodiment is basically the same as that of the first embodiment; however, the present embodiment differs from the first embodiment in that a fourth film adhesive 32 having a lower basis weight than the first film adhesive 3 and the second film adhesive 5 is disposed in the neighboring portion 9. Therefore, in the present embodiment, the different part will be described and the description of other duplicate parts will be omitted.

Incidentally, the same reference signs are assigned to the same components as those of the first embodiment and duplicate descriptions will be omitted.

Figure 3:
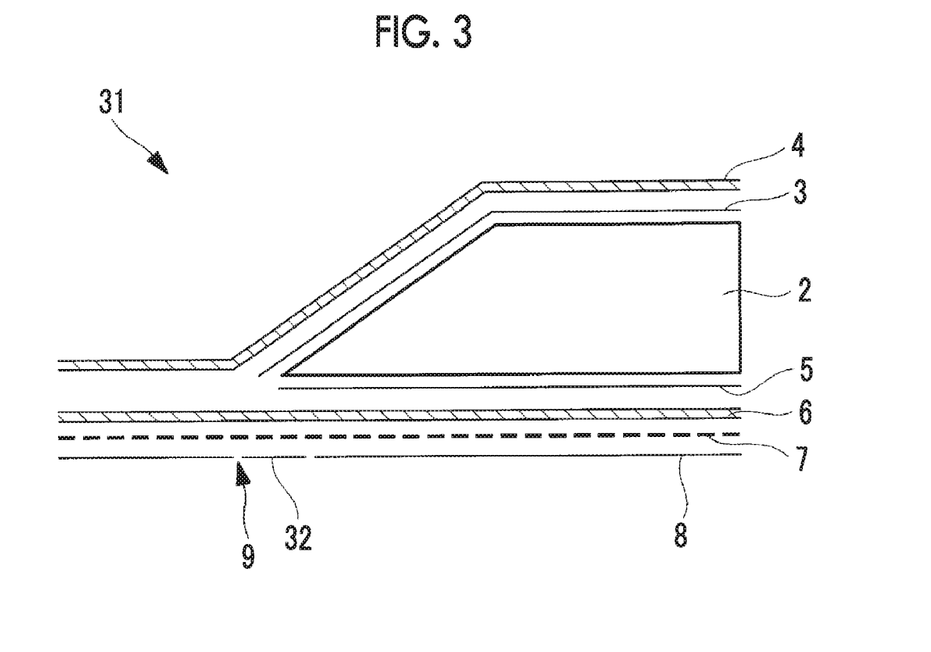
FIG. 3 is a longitudinal cross-sectional view illustrating the state of the vicinity of a tip of an end portion of a honeycomb core when a composite material according to a third embodiment of the invention is cured.

FIG. 3 is a longitudinal cross-sectional view illustrating the state of the vicinity of the tip of the end portion of the honeycomb core 2 when a composite material 31 according to the present embodiment is cured. In the composite material 31 according to the present embodiment, the fourth film adhesive 32 having a lower basis weight than the first film adhesive 3 and the second film adhesive 5 is disposed in the neighboring portion 9 of the third film adhesive 8. Incidentally, the basis weight is a weight per unit area of the film adhesive.

According to the present embodiment with the above-described configuration, the following effects are obtained.

In the composite material 31 of the present embodiment, the fourth film adhesive 32 having a lower basis weight (smaller amount of resin) than the first film adhesive 3 and the second film adhesive 5 is disposed in the neighboring portion 9 of the third film adhesive 8. As a result, the amount of resin becomes insufficient after the composite material 31 is cured, and thus bubbles can be suppressed from remaining in the surface (lower surface) of the composite material 31.

Fourth Embodiment

Next, a fourth embodiment of the invention will be described with reference to FIG. 4.

The basic configuration of the present embodiment is basically the same as that of the first embodiment; however, the present embodiment differs from the first embodiment in that instead of the third film adhesive 8, a third film adhesive 48 which is a film adhesive having a lower basis weight than the first film adhesive 3 and the second film adhesive 5 is disposed. Therefore, in the present embodiment, the different part will be described and the description of other duplicate parts will be omitted.

Incidentally, the same reference signs are assigned to the same components as those of the first embodiment and duplicate descriptions will be omitted.

Figure 4:
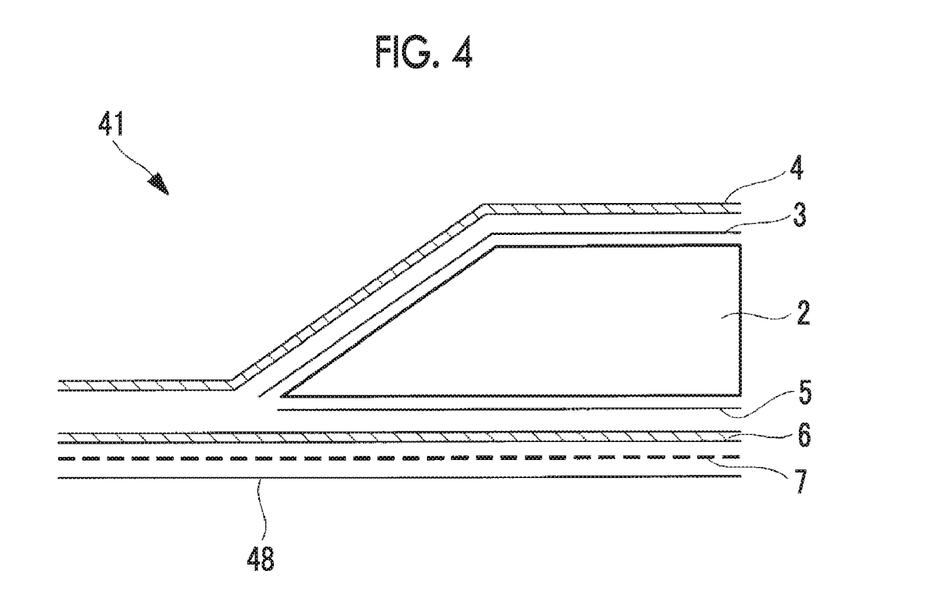
FIG. 4 is a longitudinal cross-sectional view illustrating the state of the vicinity of a tip of an end portion of a honeycomb core when a composite material according to a fourth embodiment of the invention is cured.

FIG. 4 is a longitudinal cross-sectional view illustrating the state of the vicinity of the tip of the end portion of the honeycomb core 2 when a composite material 41 according to the present embodiment is cured. In the composite material 41 according to the present embodiment, the third film adhesive 48 is a film adhesive having a lower basis weight than the first film adhesive 3 and the second film adhesive 5. Specifically, the basis weight of the first film adhesive 3 and the second film adhesive 5 may be 0.06 psf (pound square sheet) and the basis weight of the third film adhesive 48 may be 0.03 psf; the invention is not limited this example. It is preferable that the basis weight of the third film adhesive 48 is 0.02 psf to 0.04 psf. When a film adhesive having a high viscosity is used, even if the basis weight of the third film adhesive 8 is 0.06 psf or more, adhesive accumulation can be suppressed from occurring.

According to the present embodiment with the above-described configuration, the following effects are obtained.

In the composite material 41 according to the present embodiment, the third film adhesive 48 has a low basis weight (small amount of resin). As described above, since the third film adhesive 48 having a small amount of resin is used, the amount of resin in the third film adhesive 48 in its entirety can be reduced. As a result, the amount of resin flowing to a portion where adhesive accumulation is likely to occur during curing can be reduced, and thus the adhesive accumulation can be suppressed from occurring when the composite material 41 is cured. Therefore, during curing of the composite material 41, the fibers of the skin material can be suppressed from being bent to cause a reduction in strength. The composite material 41 described above can be suitably used in the aircraft structure.

Fifth Embodiment

Next, a fifth embodiment of the invention will be described with reference to FIG. 5.

The basic configuration of the present embodiment is basically the same as that of the fourth embodiment; however, the present embodiment differs from the fourth embodiment in that the film 22 having irregularities on the surface is disposed on an opposite surface (lower surface) of the third film adhesive 48 from the lightning protection mesh 7. Therefore, in the present embodiment, the different part will be described and the description of other duplicate parts will be omitted.

Incidentally, the same reference signs are assigned to the same components as those of the fourth embodiment and duplicate descriptions will be omitted.

Figure 5:
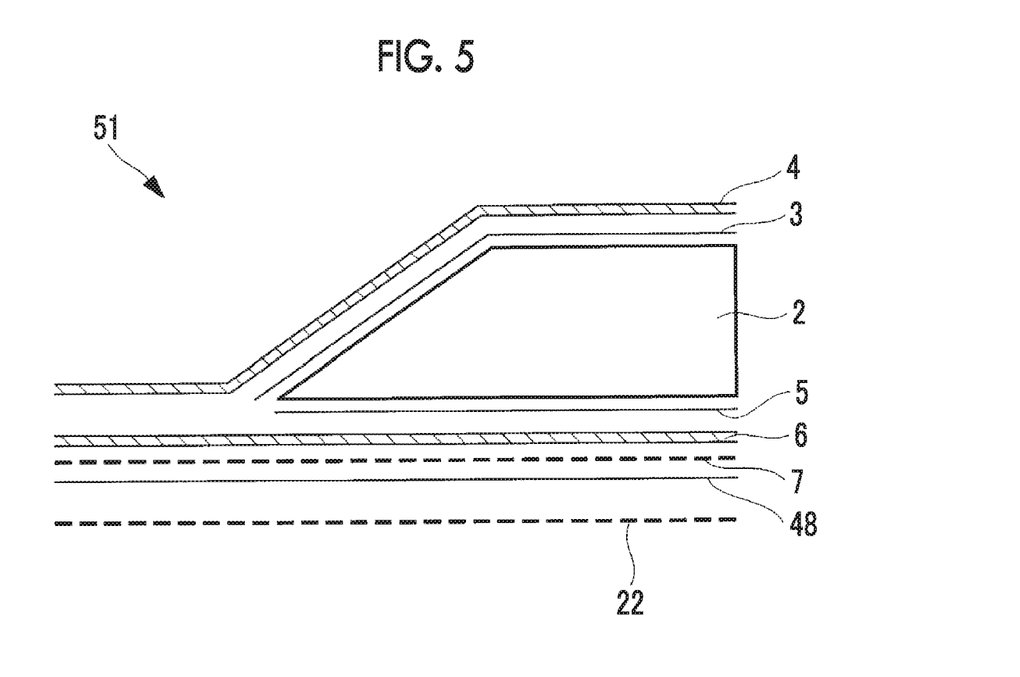
FIG. 5 is a longitudinal cross-sectional view illustrating the state of the vicinity of a tip of an end portion of a honeycomb core when a composite material according to a fifth embodiment of the invention is cured.

FIG. 5 is a longitudinal cross-sectional view illustrating the state of the vicinity of the tip of the end portion of the honeycomb core 2 when a composite material 51 according to the present embodiment is cured. In the composite material 51 according to the present embodiment, the film 22 having irregularities on the surface is disposed on the opposite surface (lower surface) of the third film adhesive 48 from the lightning protection mesh 7. As the film 22 having irregularities on the surface, the same film as described in the second embodiment may be used.

According to the present embodiment with the above-described configuration, the following effects are obtained.

In the composite material 51 according to the present embodiment, the film 22 having irregularities on the surface is disposed on the opposite surface of the third film adhesive 48 from the lightning protection mesh 7. As a result, a ventilation circuit is secured during curing of the composite material 51 by the irregularities of the film, and thus bubbles can be suppressed from remaining in the surface (lower surface) of the composite material 51. As a result, the surface quality can be improved.

Sixth Embodiment

Next, a sixth embodiment of the invention will be described with reference to FIG. 6.

The basic configuration of the present embodiment is basically the same as that of the first embodiment; however, the present embodiment differs from the first embodiment in that instead of the third film adhesive 8, a third film adhesive 68 which is a film adhesive having a higher viscosity than the first film adhesive 3 and the second film adhesive 5 is disposed. Therefore, in the present embodiment, the different part will be described and the description of other duplicate parts will be omitted.

Incidentally, the same reference signs are assigned to the same components as those of the first embodiment and duplicate descriptions will be omitted.

Figure 6:
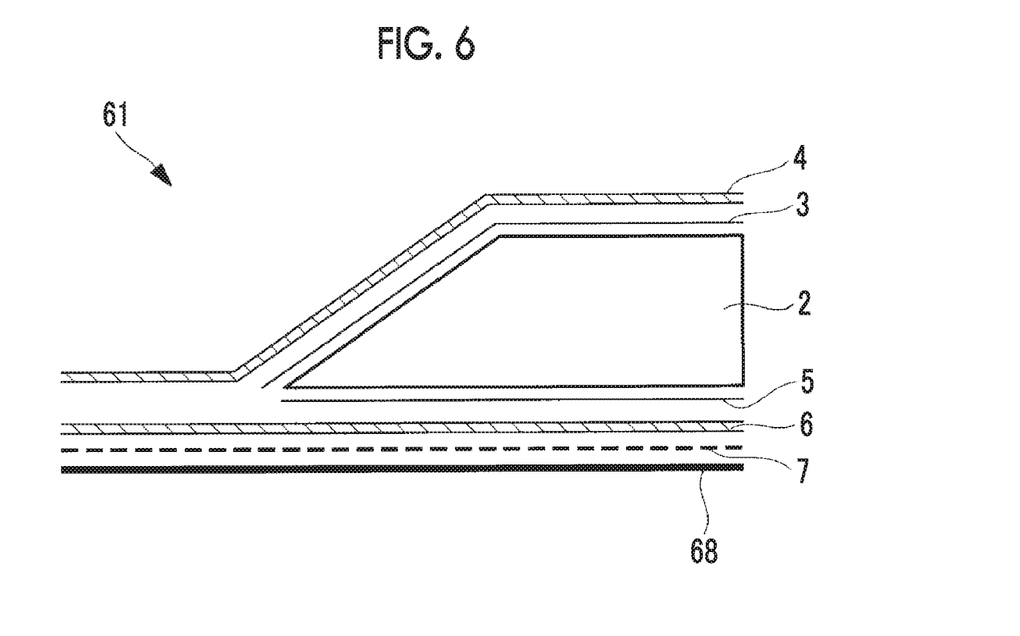
FIG. 6 is a longitudinal cross-sectional view illustrating the state of the vicinity of a tip of an end portion of a honeycomb core when a composite material according to a sixth embodiment of the invention is cured.

FIG. 6 is a longitudinal cross-sectional view illustrating the state of the vicinity of the tip of the end portion of the honeycomb core 2 when a composite material 61 according to the present embodiment is cured. In the composite material 61 according to the present embodiment, the third film adhesive 68 is a film adhesive having a higher viscosity than the first film adhesive 3 and the second film adhesive 5. Specifically, the viscosity of the first film adhesive 3 and the second film adhesive 5 may be approximately 100 Pa·S and the viscosity of the third film adhesive 68 may be approximately 1,000 Pa·S; the invention is not limited this example.

According to the present embodiment with the above-described configuration, the following effects are obtained.

In the composite material 61 according to the present embodiment, the third film adhesive 68 has a high viscosity. Here, as in the present embodiment, when the third film adhesive 68 (disposed below the honeycomb core 2) has a high viscosity (for example, 1,000 Pa·S), the fluidity of the adhesive can be reduced when the composite material 61 is cured. As a result, the adhesive can be suppressed from flowing to be accumulated in the vicinity of the tip of the end portion of the honeycomb core 2. Therefore, adhesive accumulation can be suppressed from occurring when the composite material 61 is cured. Namely, during curing of the composite material 61, the fibers of the skin material (second skin material 6) can be suppressed from being bent to cause a reduction in strength. The composite material 61 described above can be suitably used in the aircraft structure.

Seventh Embodiment

Next, a seventh embodiment of the invention will be described with reference to FIG. 7.

The basic configuration of the present embodiment is basically the same as that of the sixth embodiment; however, the present embodiment differs from the sixth embodiment in that the film 22 having irregularities on the surface is disposed on the opposite surface (lower surface) of the third film adhesive 68 from the lightning protection mesh 7. Therefore, in the present embodiment, the different part will be described and the description of other duplicate parts will be omitted.

Incidentally, the same reference signs are assigned to the same components as those of the sixth embodiment and duplicate descriptions will be omitted.

Figure 7:
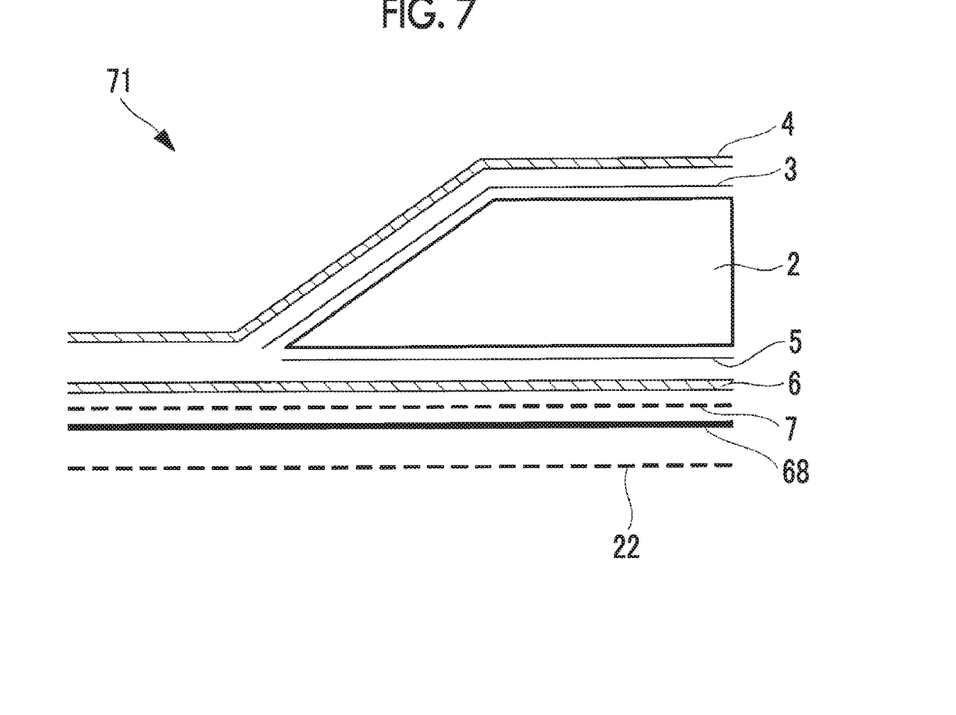
FIG. 7 is a longitudinal cross-sectional view illustrating the state of the vicinity of a tip of an end portion of a honeycomb core when a composite material according to a seventh embodiment of the invention is cured.

FIG. 7 is a longitudinal cross-sectional view illustrating the state of the vicinity of the tip of the end portion of the honeycomb core 2 when a composite material 71 according to the present embodiment is cured. In the composite material 71 according to the present embodiment, the film 22 having irregularities on the surface is disposed on the opposite surface (lower surface) of the third film adhesive 68 from the lightning protection mesh 7. As the film 22 having irregularities on the surface, the same film as described in the second embodiment may be used.

According to the present embodiment with the above-described configuration, the following effects are obtained.

In the composite material 71 according to the present embodiment, the film 22 having irregularities on the surface is disposed on the opposite surface of the third film adhesive 68 from the lightning protection mesh 7. As a result, a ventilation circuit is secured during curing of the composite material 71 by the irregularities of the film, and thus bubbles can be suppressed from remaining in the surface (lower surface) of the composite material 71. As a result, the surface quality can be improved.

The composite material of the invention as described above can be collectively cured. Even if the composite material of the invention is collectively cured and molded (one-shot molding), during curing of the composite material, the fibers of the skin material can be sufficiently suppressed from being bent to cause a reduction in strength. Therefore, one-shot molding is performed, and thus in addition to reducing the operation cost of the autoclave, a curing operation with a bag for curing is performed once; and thereby, the molding cost can be reduced. There is no need to perform a rough trim operation and a jig cleaning operation after the skin material is cured, which are required in secondary adhesive molding, and thus the process is simple.

The composite material of the invention as described above is suitably applicable to products, such as a control surface structure for future commercial aircrafts, a panel for future helicopters and space shuttles, aircraft floor materials, floor materials and frame materials for new transportation and railway vehicles, which require a lightweight and high-rigid composite honeycomb sandwich panel.

In one embodiment of the composite material according to the invention described above, the cases where the third film adhesives 8, 48, and 68 are used as a resin material have been described as one example; however, the invention is not limited thereto. Specifically, instead of the third film adhesive, a surface conditioner or the like may be used.

In one embodiment of the composite material according to the invention described above, the case where the first film adhesive 3 and the second film adhesive 5 are used has been described as one example; however, a mode where the two film adhesives are not used may be adopted. In such a case, since the film adhesives are not required, the cost can be lowered. In addition, also in the mode where the above two film adhesives are not used, molding can be performed by one-shot molding. In this case, the two skin materials (uncured prepregs) are directly bonded to the honeycomb core.

In one embodiment of the composite material according to the invention described above, the case where the end portion of the honeycomb core 2 is chamfered has been described as one example; however, chamfering may not be performed. Also when the honeycomb core is not chamfered, the above-described adhesive accumulation is expected to occur; however, when the composite material is configured as in the invention, such adhesive accumulation can be suppressed from occurring.

REFERENCE SIGNS LIST

1, 21, 31, 41, 51, 61, 71: Composite material
2: Honeycomb core
3: First film adhesive
4: First skin material
5: Second film adhesive
6: Second skin material
7: Lightning protection mesh 8, 48, 68: Third film adhesive (resin material)
9: Neighboring portion
22: Film having irregularities on the surface
32: Fourth film adhesive

The invention claimed is:

1. A composite material comprising:
a honeycomb core;
a first skin material disposed on one surface of the honeycomb core to be bonded to the honeycomb core;
a second skin material disposed on an opposite surface of the honeycomb core from the one surface to be bonded to the honeycomb core;
a lightning protection mesh disposed on an opposite surface of the second skin material from a surface of the second skin material, wherein the surface of the second skin material is bonded to the honeycomb core; and
a resin material disposed on an opposite surface of the lightning protection mesh from a second skin material side,
wherein the resin material extends past a tip of an end portion of the honeycomb core,
wherein the resin material extends so as to overlap the honeycomb core in a longitudinal cross-sectional view, and
wherein the resin material extends continuously as a whole except for a neighboring portion where no resin material is disposed, the neighboring portion being located under the tip of the end portion of the honeycomb core, and the resin material is a film adhesive having the neighboring portion therein where no resin material is disposed.

2. The composite material according to claim 1,
wherein a first film adhesive bonding the first skin material to the honeycomb core is disposed between the first skin material and the honeycomb core,
a second film adhesive bonding the second skin material to the honeycomb core is disposed between the second skin material and the honeycomb core, and
a fourth film adhesive having a lower basis weight than the first film adhesive and the second film adhesive is disposed in the neighboring portion.

3. The composite material according to claim 1, wherein a film having irregularities on a surface thereof is disposed on an opposite surface of the resin material from the lightning protection mesh.

4. The composite material according to claim 1, wherein the end portion of the honeycomb core is chamfered so as to be inclined toward the second skin material side.

5. The composite material according to claim 1, wherein the resin material has the neighboring portion where no resin material is disposed so that if the resin material flows to the neighboring portion from a surrounding area of the neighboring region during curing, accumulation of the resin material does not occur.

6. The composite material according to claim 1, wherein the resin material has the neighboring portion where no resin material is disposed so that the resin material flows to the neighboring portion from a surrounding area of the neighboring region during curing.

* * * * *